United States Patent [19]

Santilli

[11] 4,375,406

[45] Mar. 1, 1983

[54] FIBROUS CLAY COMPOSITIONS CONTAINING PRECALCINED OXIDES

[75] Inventor: Donald S. Santilli, Pinole, Calif.

[73] Assignee: Chevron Research Company, San Francisco, Calif.

[21] Appl. No.: 227,001

[22] Filed: Jan. 21, 1981

[51] Int. Cl.$^3$ .............................................. C10G 17/00
[52] U.S. Cl. ............................................... 208/251 H
[58] Field of Search ................................... 208/251 H

[56] References Cited

U.S. PATENT DOCUMENTS 4,152,250  5/1979  Inooka et al. ................... 208/251 H Primary Examiner—Curtis R. Davis
Attorney, Agent, or Firm—D. A. Newell; S. R. LaPaglia; C. L. Hartman

[57] ABSTRACT

Compositions containing fibrous clays and precalcined oxides are prepared by forming a fluid suspension of the clays with precalcined oxide particles, agitating the suspension to form a codispersion, and shaping and drying the codispersion. The precalcined oxides are preferably preloaded with catalytic metals. The compositions are useful for conversion of hydrocarbonaceous feedstocks, preferably hydroprocessing.

14 Claims, No Drawings

FIBROUS CLAY COMPOSITIONS CONTAINING PRECALCINED OXIDES

BACKGROUND OF THE INVENTION

This invention relates to porous compositions particularly useful as catalysts and catalyst supports. The compositions contain fibrous clays and have a large fraction of the pore volume present in 200 to 800 Angstrom diameter pores. The compositions of this invention are particularly useful as catalysts or catalyst supports for use in the conversion of hydrocarbonaceous feedstocks, such as crude petroleum and petroleum fractions, liquefied coal, shale oils, oils from bituminous sands (e.g., tar sands), etc., and hydrocarbonaceous fractions derived therefrom. The compositions are particularly useful for hydroprocessing heavy hydrocarbonaceous fractions which contain asphaltenes. The term "asphaltenes" as used herein refers to hydrocarbonaceous material which is insoluble in hot n-heptane, e.g., boiling at atmospheric pressure.

Naturally-occurring and synthetic clays have been suggested as catalysts for a variety of hydrocarbon conversions. Wegner et al. in U.S. Pat. No. 4,006,077, issued Feb. 1. 1977, discloses the use of extruded and dried attapulgite clays for removing metals from a hydrocarbon feed. Inooka et al. in U.S. Pat. No. 4,152,250, issued May 1, 1979, and U.S. Pat. No. 4,196,102, issued Apr. 1, 1980, disclose catalysts containing sepiolite fibers which can be bound together with oxide sols. Fukui et al. in U.S. Pat. Nos. 4,166,026 and 4,191,636 disclose a two-step hydrodemetalation and hydrodesulfurization process wherein the support for the hydrodemetalation catalyst is a magnesium silicate such as sepiolite, attapulgite and palygorskite. Hydroprocessing catalysts containing other clays are mentioned in Oleck et al., U.S. Pat. No. 3,891,541, issued June 24, 1975.

A disadvantage of prior art fibrous clay catalysts is that only a small fraction of their pore volume is present in pores in the 50 to 150 Angstrom diameter range which is known to be desirable in hydrodesulfurization catalysts. In addition, the addition of catalytic metals to fibrous clays to form a uniform dispersion is difficult, often resulting in the formation of crystalline compositions such as cobalt molybdate which generally have a lower catalytic activity.

SUMMARY OF THE INVENTION

It is an object of this invention to provide a fibrous clay-containing catalyst having a bimodal pore distribution; one which has significant fractions of the pore volume present as 50 to 150 Angstrom diameter pores and 200 to 800 Angstrom diameter pores, as measured by nitrogen adsorption. A further object is to provide a fibrous clay catalyst having a more nearly uniform dispersion of catalytic metals. Another object is to provide a fibrous clay-containing hydroprocessing catalyst having high activities for hydrodesulfurization, asphaltene conversion, and hydrodemetalation. Further objects are to provide methods for making and using such catalysts.

In one aspect, this invention is a composition of matter comprising a rigid pack comprising rods of fibrous form clay codispersed with particles comprising precalcined inorganic oxides. Preferably, the precalcined inorganic oxide particles contain one or more catalytic elements selected from Group IIA and the transition metal elements present preferably as metals, oxides or sulfides. The transition metal elements include elements of Groups IB, IIB, IIIB (including the lanthanides), IVB, VB, VIB, VIIB, and VIII shown in the Periodic Table of the Elements, *Handbook of Chemistry and Physics*, 45th Edition, Chemical Rubber Company.

In another aspect, this invention comprises a process for preparing a composition of matter comprising the steps of (a) forming a fluid suspension comprising rods of fibrous form clay, particles comprising precalcined inorganic oxide, and a fluid suspension medium; (b) agitating the fluid suspension to form a codispersion of the rods and said precalcined particles; (c) shaping the codispersion to form a shaped body; and (d) drying and calcining the shaped body. Preferably, the process also includes adding one or more catalytic metals or metal compounds to the composition either before or after codispersing and drying.

In its method of use aspects, this invention involves a method for converting a hydrocarbonaceous feedstock comprising contacting said hydrocarbonaceous feedstock under hydrocarbon conversion conditions with a catalyst comprising the compositions of this invention and containing an effective amount of catalytic components.

DETAILED DESCRIPTION OF THE INVENTION

This invention is based upon the discovery that a catalyst having a highly desirable bimodal pore distribution can be prepared by codispersing precalcined oxide particles with fibrous form clays. The dispersed fibrous form clay particles provide high pore volume in the 200 to 800 Angstroms diameter range. The precalcined oxide particles substantially retain their pore structure during preparation of the catalyst and accordingly can provide smaller pores, preferably 50 to 150 Angstroms in diameter.

The precalcined oxides interact with the fibrous clay particles differently from binder oxides which are added as sols to bind the clay fibers. Generally, oxides added as sols have been found to adversely contract the pore diameter of the composition, and should preferably not be present in amounts greater than about 40 weight percent. Precalcined oxides do not cause pore contraction. In addition, precalcined oxides can contain a desirable prefixed pore distribution and can be preloaded with catalytic elements, giving a better dispersion.

Compositions of this invention have at least two components: fibrous form clay and codispersed, precalcined oxide particles. By "codispersed" is meant that fiber bundles of the fibrous form clay are broken up, e.g., by vigorous agitation, and dispersed with the precalcined oxide particles. Suitable fibrous clays include naturally-occurring and synthetic clays which are predominantly characterized by long, slender fibers (which can be hollow), as opposed to plates or grainy structures. The individual fibers generally range from 0.5 to 5 micrometers in length and have a diameter ranging from about 50 to 2000 Angstroms. Such fibrous clays generally occur as aluminosilicates, magnesium silicates and aluminomagnesium silicates. Examples of suitable fibrous clays are attapulgite, palygorskite, sepiolite, halloysite, endellite, chrysotile asbestos, and imogolite. Attapulgite is preferred because of its high length-to-diameter ratio, its ready availability, and its low cost.

The precalcined oxide component can be any oxide which is suitable for use as a catalyst support material.

Typical of such oxides are silica, alumina, magnesia, zirconia, beryllia, boria, and titania, and mixtures and cogels thereof. The oxides are precalcined, that is, calcined prior to codispersion with the fibrous clay rods. The calcination is generally at 250° C. or higher and removes water of hydration and in some cases, converts the oxide to a more catalytically active phase. For example, alumina, which is normally obtained in the form of an alumina monohydrate (boehmite), should be calcined by heating at least to sufficient temperature for sufficient time to convert the alumina to the active chi, eta, gamma, kappa, delta, theta, or alpha forms. The calcination must generally be above about 275° C. and preferably, above 500° C., depending on the form of the alumina hydrate. A useful diagram of the phases of alumina prepared from the different oxide hydrates is shown in the aforementioned U.S. Pat. No., 3,891,541 to Oleck et al., for "Process for Demetallizing and Desulfurizing Residual Oil with Hydrogen and Alumina-Supported Catalyst," in FIG. 5, which is incorporated herein by reference.

The use of precalcined oxides according to this invention serves two functions. One function is to lessen or eliminate the tendency of the oxide to bind the fibrous clay rods and thereby reduce the pore diameter. Another function is to fix the pore structure and stabilize the form of the oxide particles so that the particles will not become peptized during the codispersion step. If the oxide particles become peptized, i.e., form a sol, they will lose their pore structure and the desired bimodal pore structure will not result. By "bimodal" pore structure is meant a volumetric pore size distribution such that a graph of the pore volume as a function of pore diameter shows two relatively wide peaks. For example, a catalyst of this invention when used for hydroprocessing heavy hydrocarbonaceous feedstocks which contain metals, sulfur and asphaltenes should desirably contain wide differential pore volume peaks both in the 50 to 150 Angstroms diameter pore region and in the 200 to 800 Angstroms diameter pore region. These wise peaks indicate relatively large fractions of the pore volume being supplied by such pores. For example, about 30 to 60 percent of the nitrogen adsorption pore volume can be provided by 50 to 150 Angstrom diameter pores and about 10 to 30 percent of the pore volume can be provided by 200 to 800 Angstrom diameter pores.

The ratio of fibrous form clay to precalcined oxide in the composition can vary over a wide range, for example, from 20:1 to 1:5 by weight. The ratio will be determined by such considerations as the desired percentage of pore volume in the 50 to 150 Angstroms diameter range (provided by the precalcined oxide), the desired strength of the catalyst, as well as economic factors.

The composition preferably also contains a binder oxide which has not been precalcined. The binder oxide is added preferably as a sol or hydrogel and functions to enhance the strength of the composition. Any of the well-known binders used in catalyst manufacture are suitable, for example, alumina, silica, magnesia, boria, halfnia, titania, and mixtures and cogels thereof.

The composition of this invention can be used as a catalyst, catalyst support, or absorbent, particularly, as a catalyst or catalyst support for hydrocarbon conversions such as reforming, alkylation, isomerization, catalytic cracking, and hydroprocessing, including hydrocracking, hydrotreating, hydrofining, hydrodemetalation, hydrodesulfurization and hydrodenitrogenation.

Catalytic elements can be present as is conventional for the various catalytic processes, for example, elements from Group IIA and the transition elements preferably present as metals, oxides or sulfides. The catalytic metals can be added by conventional techniques of impregnation or coprecipitation, before, after, or both before and after the precalcined oxide particles are codispersed with the fibrous clay rods. Preferably, the catalytic elements are present in the precalcined oxide particles prior to codispersion of the oxide particles with the fibrous clay. It is particularly convenient for the precalcined particles to be prepared from finished catalysts which contain catalytic metals added by conventional techniques such as impregnation, coprecipitation, or cogellation, etc. The metals-loaded catalyst particles are simply ground to the desired particle size and codispersed with the clay rods as described herein.

When intended for hydroprocessing service, the composition should contain one or more catalytic elements from Group VIB and Group VIII of the Periodic Table. Particularly desirable are combinations of cobalt/molybdenum, nickel/molybdenum, and nickel/tungsten. In general, the amount of catalytic elements, calculated as pure metal should be in the range of about 2 to 30 percent by weight, based upon the entire composition. Preferably a Group VIII component should be present at 2 to 5 weight percent and a Group VIB component should be present at 2 to 20 weight percent, calculated as metal, based on the entire composition.

A composition which is particularly desirable for conversion of heavy hydrocarbonaceous feedstocks is prepared from ground, precalcined oxide particles having pore volume predominantly, e.g., at least 70 percent, present in 50 to 150 Angstrom diameter pores, for example, at least 80 percent of the pore volume provided by 50 to 100 Angstrom pores, or at least 70 percent provided by 80 to 150 Angstrom pores. Preferably, the precalcined oxide has been preloaded with catalytic Group VIB and Group VIII elements, then codispersed with fibrous clay, and the composite, after drying and calcining, is impregnated, preferably again with Group VIB and Group VIII elements. Such a catalyst has a high conversion activity for heavy oils. The activity is thought to be the result of partial cracking of large molecules (asphaltenes), catalyzed by active metals in the large pores accessible to such molecules, to form molecules which can more easily fit into the pores of the precalcined material. In addition, the ground, precalcined oxide has a very high surface area which is accessible to hydrocarbon molecules which have penetrated the larger pores provided by the dispersed clay rods. The larger pores allow facile diffusion of large resid molecules into the catalyst. This not only increases catalyst activity, but also the catalyst life by causing deposition of metallic impurities throughout the catalyst, rather than only in the external regions.

The composition of this invention can be adapted to virtually any catalytic use by inclusion of the appropriate catalytic metals components. It can also contain aluminosilicate zeolite components such as faujasite, acid-treated faujasite, ZSM-5 type aluminosilicates, etc. Those skilled in the art of catalysts of hydrocarbonaceous materials can readily formulate appropriate catalytic compositions for virtually any desired are using techniques well known in the art. All that is necessary is that a catalyst comprising the composition of this invention be contacted with a hydrocarbonaceous feedstock under wellknown hydrocarbon conversion conditions.

When the composition is to be used as a reforming catalyst, it should contain one or more Group VIII elements, preferably from 0.3 to 1 percent by weight platinum and 0.3 to 1 percent by weight rhenium. The preparation of a preloaded, precalcined oxide suitable for use in preparing such a reforming catalyst is described in U.S. Pat. No. 4,082,697, issued to Tamm on Apr. 4, 1978, for "Catalyst Carrier, its Method of Preparation, and a Reforming Catalyst Supported on the Carrier," which is incorporated herein by reference. Such a catalyst can be used to treat reformable hydrocarbonaceous feedstocks such as light straight run gasolines, naphthas boiling within the range of 20° C. to 300° C. and fractions thereof, having preferably less than ten parts per million sulfur. Suitable reforming conditions include reaction temperatures of 300° C. to 600° C., preferably 370° C. to 570° C., pressures of 1 to 70 atmospheres, preferably 3 to 50 atmospheres, and a liquid hourly space velocity of 0.1 to 10, preferably 1 to 5 reciprocal hours. When the composition is to be used in a hydroprocessing embodiment, the catalyst should preferably contain 2 to 5 percent cobalt or nickel present as oxide or sulfide and 5 to 20 percent molybdenum present as oxide or sulfide, either wholly associated with the precalcined oxide component of the catalyst or associated with both the precalcined oxide and the fibrous clay component. Binder oxides, if present, may also have catalytic metals associated with them. Examples of feedstocks for hydroprocessing include crude petroleum, liquids from coal liquefaction processes such as fractions or hydrogenated fractions resulting from the dissolution of coals, including peat, lignite, subbituminous, and bituminous coals. Other suitable hydroprocessing feeds are hydrocarbonaceous products or fractions derived from shale oil, bituminous sands and petroleum, including atmospheric and vacuum residua, topped crude, reduced crude, as well as distillate materials such as vacuum gas oil from petroleum, coal liquids, etc., as well as other heavy fractions containing significant amounts of materials boiling above about 300° C. The catalyst is particularly desirable for hydroprocessing fractions which contain heavy metals, e.g., vanadium, nickel and iron and a large percentage, e.g., 2 to 20 percent or more by weight n-heptane insoluble asphaltenes. These asphaltenes are generally present as large macromolecules up to 100 or 200 Angstroms in diameter and find easy access in the large pores of the catalyst of this invention. All that is necessary for the hydroprocessing of hydrocarbonaceous feedstocks according to this invention is that the feedstock be contacted with a bed containing the catalyst of this invention under well-known hydroprocessing conditions. Suitable hydroprocessing conditions include temperatures of 250° C. to 450° C., pressures of from 30 to 200 atmospheres, hydrogen gas rates of 180 to 1800 cubic meters per cubic meter of feedstock and liquid hourly space velocities of 0.1 to 10 reciprocal hours.

The composition of this invention can be made by forming in a fluid suspension medium, a suspension comprising rods of fibrous form clay and particles comprising precalcined inorganic oxides. Binder oxide, in an amount up to 40 percent by weight, on a dry weight basis, can be present. The fluid suspension is then agitated sufficiently by conventional techniques, preferably blendoring, to form a codispersion of the rods and the particles. The codispersion is then shaped to form a shaped body which is dried and calcined. The fluid suspension medium can be any fluid which does not interact with the particles undesirably. Preferably, aqueous solutions such as water are used but organic solutions may be used if desired. The precalcined oxide particles are most preferably obtained by conventional techniques for preparing oxide catalyst supports of a desirable pore distribution, preferably having large volumes in the 50 to 150 Angstroms diameter range. When pores in the 50 to 100 Angstrom range are desirable, the precalcined particles can be provided using cogellation procedures known in the art. Example 1 illustrates the preparation of a metals-loaded, precalcined oxide having an average pore diameter of about 70 to 90 Angstroms, which can be ground after calcination for use in preparing the catalyst of this invention.

EXAMPLE 1

The following aqueous solutions are added to water based on 100 grams of catalyst: 158 grams of 21.5 percent $AlCl_3$, 57 grams of 30.7 percent $NiCl_2$, 12 grams of 75 percent $H_3PO_4$, 460 grams of 17.5 percent $AlCl_3$, 5.15 percent $TiCl_4$, 13.6 percent acetic acid, and 200 grams of sodium molybdate solution containing 20 grams of molybdenum. The pH is raised to 6.5 with 8.0 percent aqueous ammonia which causes the formation of a gel. The nickel, molybdenum and titania precipitate out with the aluminum and phosphorus as a hydrous oxide cogel, providing a good distribution of metals throughout the ultimate catalyst. The catalyst gel is aged about 77° C. for 1 hour to provide the proper density. The gel is then filtered and the filter cake is partly dried. The cake is extruded twice to homogenize the partly dried gel thoroughly. The extrudates are washed and then calcined for 4 hours at about 200° C. and then for 5 hours at about 500° C. in air. The resulting catalyst is analyzed to contain about 8.7 weight percent nickel as NiO, 19.7 weight percent molybdenum as $MoO_3$, 3.0 weight percent phosphorous as $P_2O_5$, and 4.9 weight percent titania as $TiO_2$. The pore volume is about 0.45 to 0.50 cc per gram with an average pore diameter of 70 to 90 Angstroms.

Example 2 illustrates the preparation of a metals-loaded, precalcined oxide having an average pore diameter in the range of 100 to 150 Angstroms.

EXAMPLE 2

Catapal SB alumina, available from Continental Oil Company, sized in the range of below about 150 micrometers, is treated by admixing with an aqueous solution of nitric acid, where for each formula weight of alumina, about 0.1 equivalent of acid is used. The treated alumina powder is in the form of a workable paste. The properties of the paste are such that a sample of the paste completely disperses when 1 part is slurried in 4 parts by weight of water and the pH of the slurry is in the range of about 3.8 to about 4.2, usually about 4.0. After aqueous acid treatment of the alumina powder, aqueous ammonium hydroxide is thoroughly admixed into the paste in an amount equivalent to about 80 percent of the ammonium hydroxide theoretically required to completely neutralize the nitric acid; that is, about 0.08 equivalent of the hydroxide is added to the paste per formula weight of the alumina. The ammonium hydroxide used is desirably about an 11 percent by weight solution because the volatiles (material evolved during subsequent drying and calcination) content of the treated and neutralized solid should be in the range of about 50 to 70 weight percent. With the addition and thorough admixing of ammonium hydroxide, the paste changes to a free-flowing particulate solid suitable as a feed to an extruder. When the sample of the solid is slurried in water (4 parts water to 1 part solid), the pH of the slurry is in the range from 5 to 7.5, usually about 6.5. A conventional auger-type extruder is used for shaping the partially neutralized solids into a precursor of the precalcined oxide. The formed precursor is freed of loosely held water by an initial moderate drying step, for example, at a temperature in the range of 65° to 260° C. The preparation of the oxide is then completed by calcining the dried extrudate at a temperature between about 260° and 920° C. in a dry or humid atmosphere. The resulting precalcined alumina has a pore volume about 0.7 cc per gram of which at least about 85 percent is furnished by pores having a diameter in the range between about 80 and 150 Angstroms. Less than about 1.0 percent of the pore volume is furnished by pores larger than 1,000 Angstroms. It is preferred that this precalcined oxide be impregnated with metals before being used in the formulation of the composition of this invention. The catalytic metals are incorporated into the carrier by any of the well known methods, preferably by impregnation procedures. Alternately, the metallic catalytic agents can be added to the mixture prior to extrusion, either by comulling or cogellation. If impregnation is used, it is preferably performed as a single step impregnation of the alumina using a solution of a cobalt or nickel salt, and a heteropolymolybdic acid, for example, phosphomolybdic acid. In general, the amount of catalytic agent calculated as pure metal should be in the range of about 2 to 30 parts by weight per 100 parts of the composition. Preferably, the cobalt or nickel content of the catalyst should be in the range of 2 to 5 parts calculated as the pure metal, and the molybdenum or tungsten content should be 5 to 20 parts calculated as pure metal. Of course, the metals can be present in the compound form such as the oxide or sulfide.

After the precalcined oxide is prepared, either with or without catalytic metals, it is ground to a particle size of preferably smaller than 150 micrometers in diameter. Particles above 150 micrometers in diameter are undesirable because weak extrudates result and less active surface area is available to large molecules.

The ground and precalcined oxide is admixed with fibrous form clay particles, preferably in a dry mixture with a clay/precalcined oxide weight ratio of from 20:1 to 1:5. To the dry mixture is added sufficient suspension medium, such as water, to form a thin suspension, for example, 5 to 50 volumes of water per combined volume of clay and precalcined oxide. The resulting fluid suspension is vigorously agitated to form a codispersion of the rods and the inorganic particles. A Waring blender is satisfactory for this purpose. The formation of the codispersion of the rods and the particles is indicated by the slurry becoming viscous, of a milkshake-like consistency. The codispersion is partially dried by heating to 50° C. to 100° C. for a sufficient time to provide a volatiles content of about 50 to 150 percent by volume, relative to solids. The codispersion is then shaped, i.e., by extrusion, to form a body of the desired dimensions. The shaped body is then further dried and calcined. The drying step is performed, for example, at 50° C. to 110° C., for 1 to 2 hours and the calcination is performed by heating to a sufficient temperature, such as 450° C. to 550° C., for sufficient time, such as 1 to 4 hours to strengthen the article. It is preferred that the codispersion formed by agitation also contain about 5 to 20 percent of a binder oxide, i.e., a nonprecalcined oxide, present in colloidal sized particles such as the Catapal SB alumina present as an alpha-aluminamonohydrate. It is preferred that alumina binder oxides be added as a peptized suspension in HNO3 solution.

Example 3 illustrates the use of the catalyst composition of this invention for the hydroprocessing of heavy hydrocarbonaceous oils.

EXAMPLE 3

Catalyst A was prepared by mulling −100 mesh attapulgite clay with 15 percent noncalcined alumina monohydrate (Catapal SB) as a sol for about 1 hour with enough water added so that the mixture could be extruded, i.e., about 50 percent water, 50 percent solids. The mixture was extruded to a 1/26 inch extrudate which was dried at 50° C. for 2 hours and calcined at 500° C. for 1 hour. Two percent cobalt and 6 percent molybdenum were impregnated onto the extrudate by the pore fill method using an aqueous solution of cobalt nitrate and phosphomolybdic acid, adding enough water to fill the pores. The catalyst was dried at 50° C. for 2 hours and calcined at 500° C. for 1 hour.

Catalyst B was prepared by forming a mixture containing as a binder oxide 5 percent Al2O3 added as a sol of Catapal alumina, to a 1:1 by weight mixture of attapulgite (−100 mesh) and −150 mesh ground, preloaded, precalcined oxide particles as prepared according to the general procedure of Example 1. The resulting mixture was suspended in water and blended in a Waring blender to form a viscous slurry. After drying to remove most of the water, the thick paste was extruded into 1/26 inch extrudate, dried at 50° C. for 2 hours and calcined at 500° C. for 1 hour.

Catalyst C was prepared as catalyst B only the impregnated oxide of Example 2 was used after grinding to −150 mesh size, rather than the oxide of Example 1.

Catalyst D was prepared from catalyst B only additional cobalt and molydenum were added by impregnating the material in the same manner as catalyst A. Catalyst E was a catalyst of a composition prepared according to Example 2.

Catalysts A through E were contacted with an Arabian Heavy atmospheric residuum feedstock under the hydroprocessing conditions listed in Table 1.

TABLE 1

| Temperature | 380° C. |
|---|---|
| Pressure | 110 atmospheres |
| Hydrogen Flow Rate | 900 meters$^3$/meters$^3$ |
| Space Velocity | 0.86 hours$^{-1}$ |

The metal, sulfur and asphaltene composition of the feed and the products of the hydroprocessing tests are shown in Table 2.

TABLE 2

| | V (ppm) | Ni (ppm) | % S (wt.) | % Asphaltenes (wt.) |
|---|---|---|---|---|
| Feed | 83 | 22 | 4.4 | 7.2 |
| Product Treated Over Catalyst | | | | |
| A | 59 | 20 | 3.9 | 5.9 |
| B | 40 | 17 | 2.4 | 3.4 |
| C | 40 | 16 | 2.9 | 3.9 |
| D | 35 | 16 | 2.3 | 2.9 |
| E | 42 | 14 | 1.1 | 4.5 |

It can be seen from Table 2, that catalyst C, which contained components of catalyst A and catalyst E, showed a better metals and sulfur removal activity than catalyst A and better asphaltene conversion than catalyst E. Catalysts B and D showed even better asphaltene conversions and metals and sulfur removal than did catalyst C.

The asphaltene fraction of the products from the hydroprocessing tests were separated and analyzed for heteroatom content to determine the ability of the catalyst of hydroprocessing the heaviest end of the feedstock. Table 3 shows the metals and sulfur content of the asphaltenes. Again it is shown that catalysts C, B and D of this invention had better metals and sulfur removability than catalyst E.

TABLE 3

|  | V (ppm) | Ni (ppm) | % S (wt.) |
| --- | --- | --- | --- |
| Feed Asphaltenes | 1030 | 300 | 10.5 |
| Product Asphaltenes Treated Over Catalyst | | | |
| A | 670 | 240 | 7.5 |
| B | 560 | 260 | 6.9 |
| C | 670 | 270 | 7.9 |
| D | 650 | 250 | 7.5 |
| E | 1270 | 420 | 12.6 |

The foregoing examples were presented for illustrative purposes only and are not to be considered limiting. It is contemplated that workers in the art will find that a variety of oxides and clay materials of similar structure and properties from those shown herein can be used according to this invention without departing from the spirit and scope of this invention. Such compositions and modifications thereof are contemplated as equivalents of the composition described herein.

What is claimed is:

1. A process for hydroprocessing a hydrocarbonaceous feedstock comprising:
   contacting said feedstock with hydrogen in the presence of hydrogen under hydroprocessing conditions in the presence of a composition of matter prepared by the method of:
   (a) forming a fluid suspension comprising rods of fibrous form clay, particles comprising precalcined inorganic oxide, and a fluid suspension medium;
   (b) agitating the fluid suspension to form a codispersion of the rods and said precalcined particles;
   (c) shaping the codispersion to form a shaped body; and
   (d) drying and calcining the shaped body.

2. The process of claim 1 wherein said particles comprising precalcined inorganic oxide have at least 70 percent of their pore volume present in 80 to 150 Angstrom pores.

3. A process for hydroprocessing a hydrocarbonaceous feedstock comprising:
   contacting said feedstock with hydrogen under hydroprocessing conditions in the presence of a composition of matter comprising rods of fibrous form clay codispersed with particles of precalcined inorganic oxide containing one or more catalytic elements selected from Group IIA and the transition elements, present as metals, oxides or sulfides.

4. The process of claim 3 wherein said inorganic oxide is alumina.

5. The process of claim 3 wherein said fibrous form clay is selected from the group comprising attapulgite, palygorskite, sepiolite, halloysite, endellite, chrysotile and imogolite.

6. The process of claim 3 wherein said catalytic elements are selected from Group VIB or VIII.

7. The process of claim 3 wherein said precalcined inorganic oxide particles have at least 70 percent of their pore volume present in 80 to 150 Angstrom pores.

8. A process for hydrodemetallizing a heavy hydrocarbonaceous feedstock containing asphaltenes and heavy metal contaminants comprising:
   contacting said feedstock with hydrogen under hydrodemetallation conditions in the presence of the composition of matter prepared by the method of:
   (a) forming a fluid suspension comprising rods of fibrous form clay, particles comprising precalcined inorganic oxide, and a fluid suspension medium;
   (b) agitating the fluid suspension medium to form a codispersion of the rods and said precalcined particles;
   (c) shaping the codispersion to form a shaped body; and
   (d) drying and calcining the shaped body.

9. The process of claim 8 wherein said particles comprising precalcined inorganic oxide have at least 70 percent of their pore volume present in 80 to 150 Angstrom pores.

10. A process for hydrodemetallizing a heavy hydrocarbonaceous feedstock containing heavy metal contaminants and asphaltenes comprising:
    contacting said feedstock with hydrogen under hydrometallation conditions in the presence of a compsition of matter comprising rods of fibrous form clay codispersed with particles of precalcined inorganic oxide containing one or more catalytic elements selected from Group IIA and the transition elements, present as metals, oxides or sulfides.

11. The process of claim 10 wherein said inorganic oxide is alumina.

12. The process of claim 10 wherein said fibrous form clay is selected from the group consisting of attapulgite, palygorskite, sepiolite, halloysite, endellite, chrysotile and imogolite.

13. The process of claim 10 wherein said catalytic elements are selected from Group VIB or VIII.

14. The process of claim 10 wherein said particles of precalcined inorganic oxide have at least 70 percent of their pore volume present in 80 to 150 Angstrom pores.

* * * * *